Figure 1:
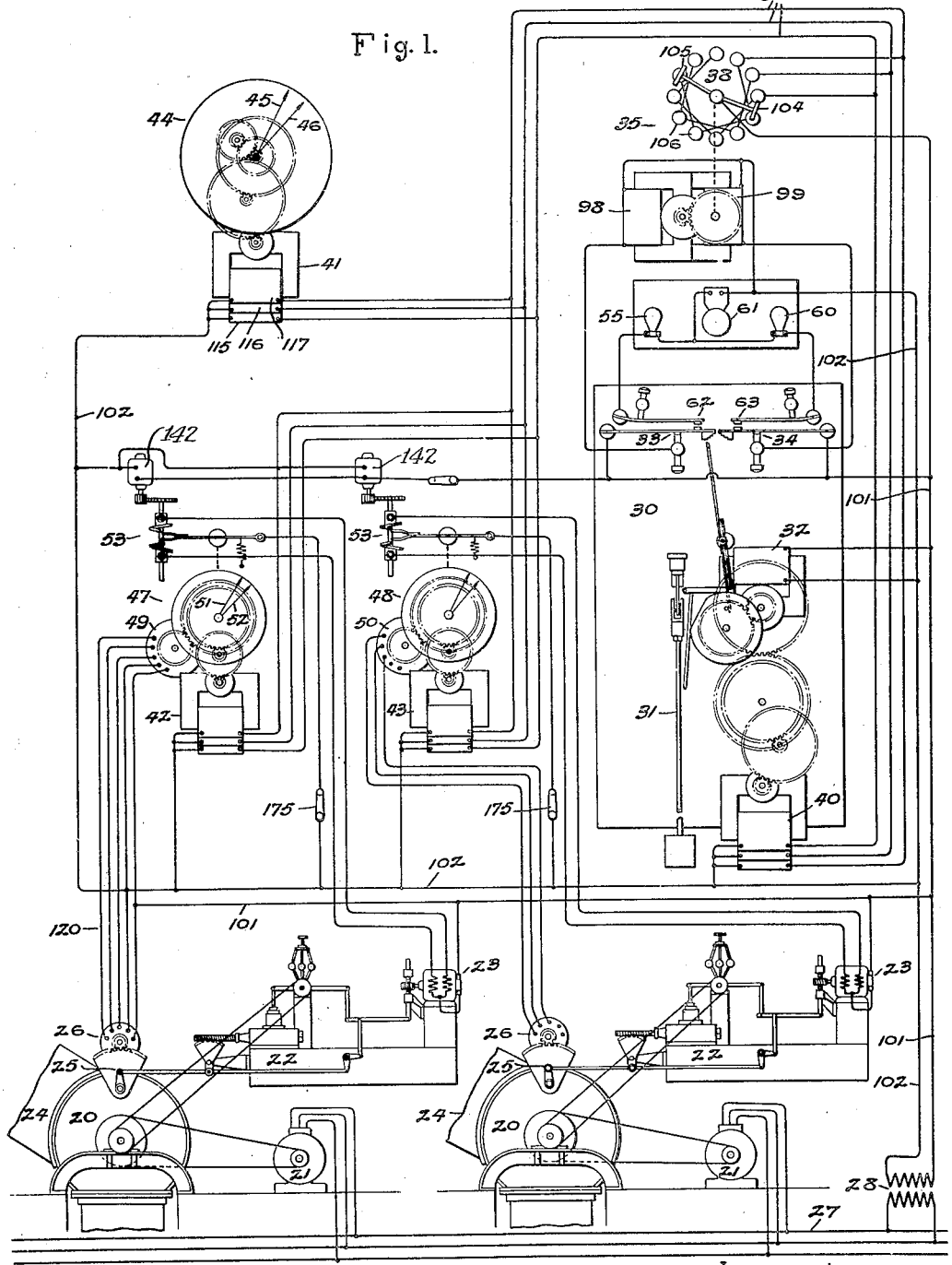

May 2, 1933.  H. E. WARREN  1,906,439
FREQUENCY REGULATING SYSTEM
Filed Jan. 8, 1929  5 Sheets-Sheet 2
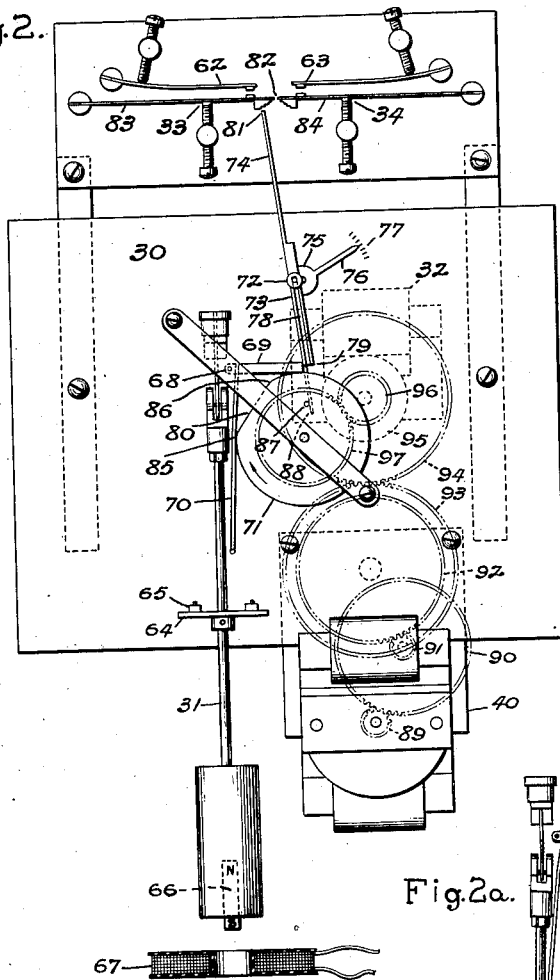
Fig.2.
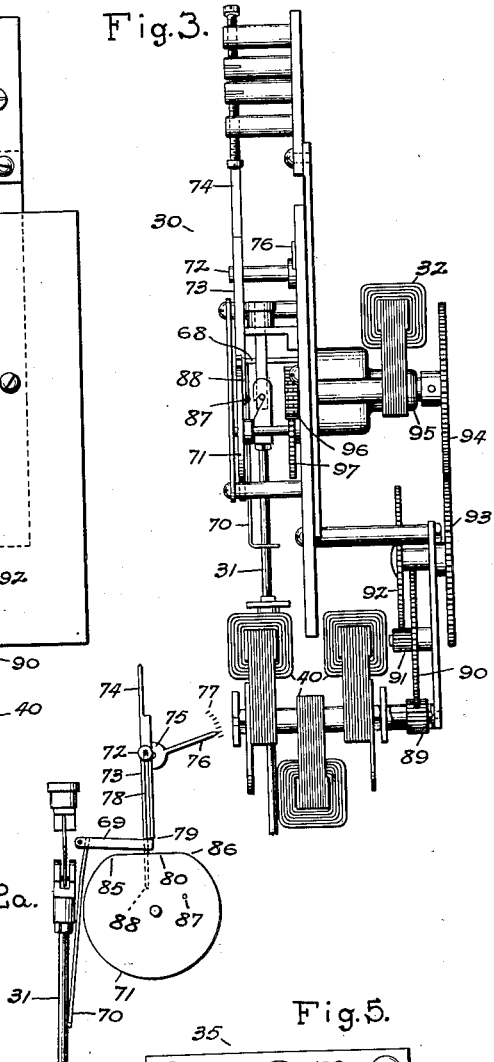
Fig.3.
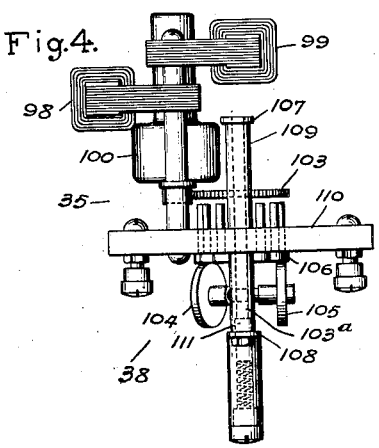
Fig.4.
Fig.2a.
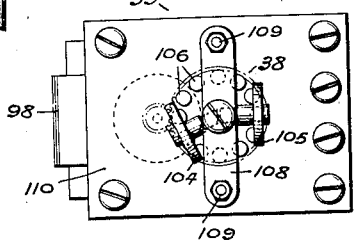
Fig.5.
Inventor:
Henry E. Warren,
by Charles E. Tullar
His Attorney.

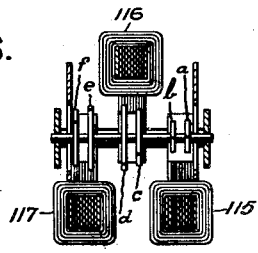
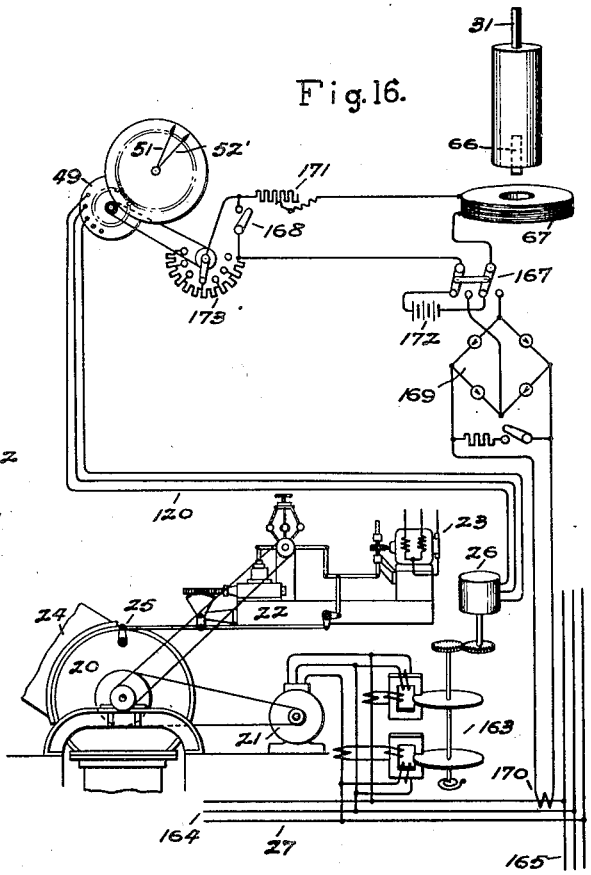
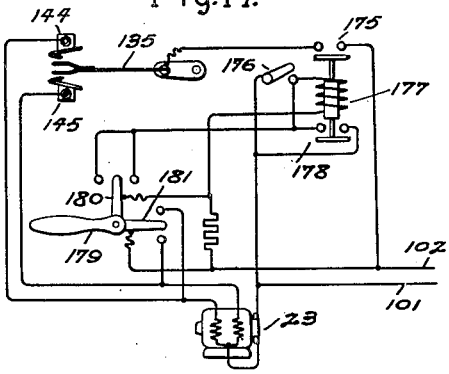

May 2, 1933.  H. E. WARREN  1,906,439
FREQUENCY REGULATING SYSTEM
Filed Jan. 8, 1929   5 Sheets-Sheet 4
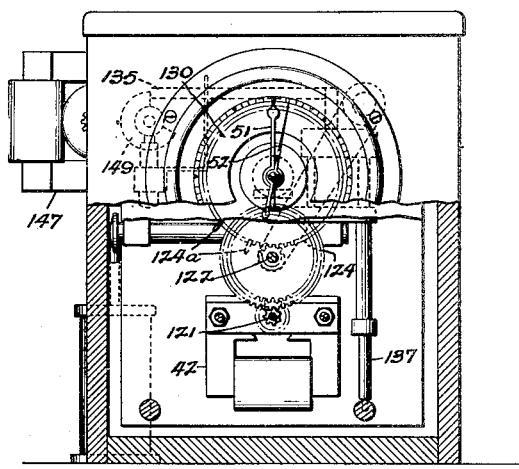
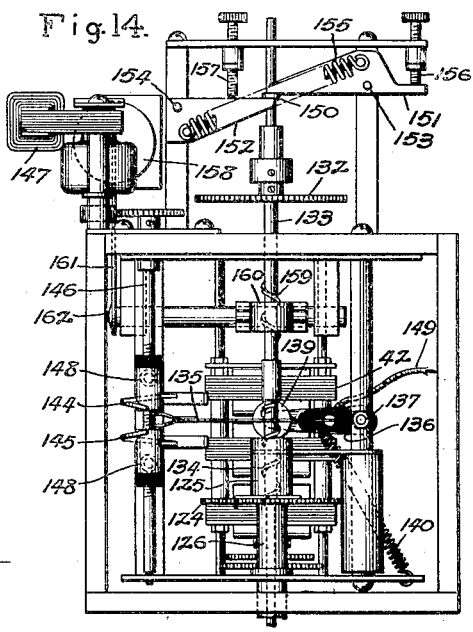
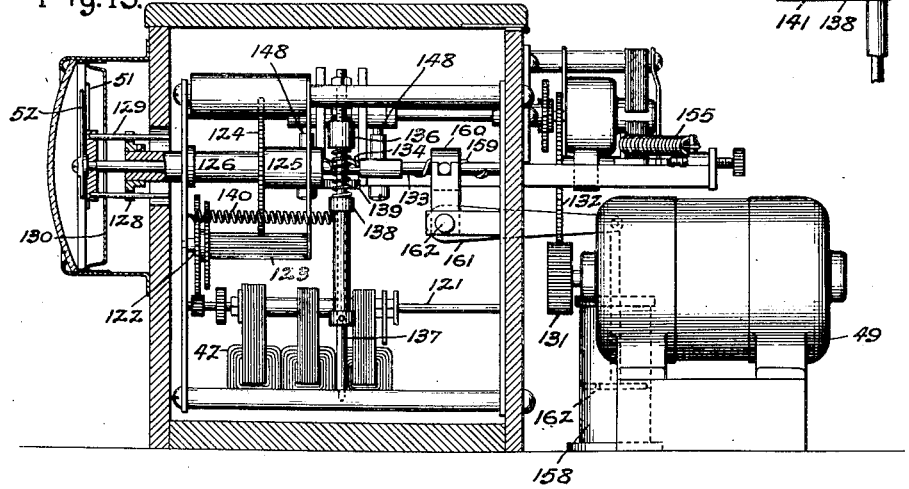
Inventor:
Henry E. Warren,
by Charles A. Tullor
His Attorney.

Inventor:
Henry E. Warren,
by Charles E. Tullo
His Attorney.

Patented May 2, 1933

1,906,439

UNITED STATES PATENT OFFICE

HENRY E. WARREN, OF ASHLAND, MASSACHUSETTS, ASSIGNOR TO WARREN TELE-CHRON COMPANY, OF ASHLAND, MASSACHUSETTS, A CORPORATION OF MAINE

FREQUENCY REGULATING SYSTEM

Application filed January 8, 1929. Serial No. 331,149.

My invention relates to the automatic frequency regulation of alternating current power distribution systems, and its object is to provide such regulation at an appreciably higher degree of accuracy than has heretofore been considered feasible.

Application Serial No. 447,037, filed April 24, 1930, is a division of this application, and reference is made thereto for claims directed to the regulation of power generating apparatus disclosed herein. Application Serial No. 530,708, filed April 16, 1931, is another division of this application, and reference is made thereto for claims directed to the total integrated frequency error measurement and regulation for maintaining system time disclosed herein.

The control of the frequency of alternating current distribution systems by means of master clocks to permit of the distribution of time by means of synchronous motor driven secondary clocks is now well known. Such a system is described in my Patent 1,420,896. In such systems the master clock serves to measure the integrated error in frequency of the system and to control the speed of the power generating apparatus so as to correct for the error by raising or lowering the instantaneous frequency until the integrated error has been corrected.

Owing to the extensive interconnection of power systems it becomes increasingly important from the power plant operating standpoint that the instantaneous frequency as well as the integrated frequency shall be closely regulated since appreciable changes in instantaneous frequency generally results in a disturbing influence on the load distribution between different generating units and generating plants connected to the system. By means of the present invention the integrated frequency and the instantaneous frequency are both maintained at high accuracy.

In carrying my invention into effect I provide apparatus for measuring the integrated frequency error over small time intervals, for example over two second intervals. The error thus measured may be less than 1/400th of a second and because of the shortness of the time interval and the inertia of power generating apparatus it is likewise an approximately correct measurement of the error in instantaneous frequency. Automatic apparatus is provided for regulating one or more of the prime movers of the power generating apparatus in a manner to correct for any error thus determined and the extent of such regulation is proportional to the error as measured during each interval. Thus I obtain a practically continuous automatic regulation which is corrective of extremely small errors in the frequency of the system.

Furthermore I preferably select the total allowable integrated error within which it is desired to maintain the frequency and proportion this allowable selected integrated frequency error to the total amount of regulation available and then maintain a similar relation between the actual total integrated frequency error and the degree of regulation. For example let us assume it is desired to keep within a total integrated frequency error of five seconds and the available amount of regulation corresponds to the regulation of a 5,000 kw. power unit from no load to full load. If then the measured integrated frequency error of the system is three seconds slow the regulation of the power unit is maintained such that it delivers 3,000 kw. If the integrated frequency error increases to four seconds the power unit will be adjusted to deliver 4,000 kw. If the regulation of one such power unit is insufficient to maintain the frequency within the allowable error additional power units in the same or in different stations are brought under control such, for example, that the available regulation corresponds to the regulation of 10,000 or 50,000 kw. of energy or whatever amount is sufficient to maintain the integrated frequency error of the system within the allowable limit.

Where a number of power generating units are regulated in accordance with my invention I also include automatic means for maintaining the proper load distribution between the various units being regulated. Other objects and novel features of my invention will appear from the description which follows.

Figure 18:
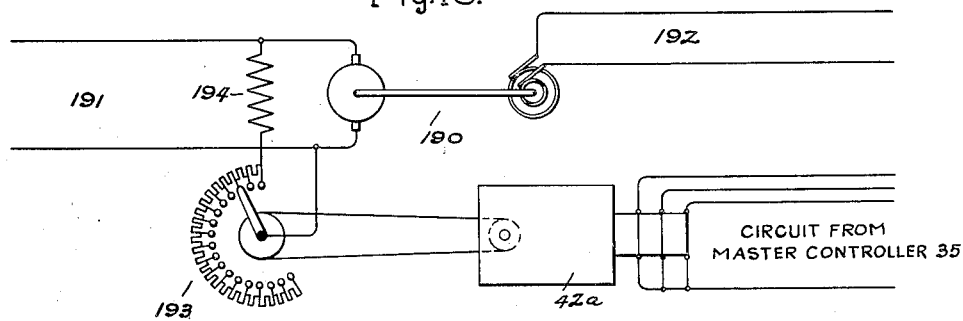
Figure 19:
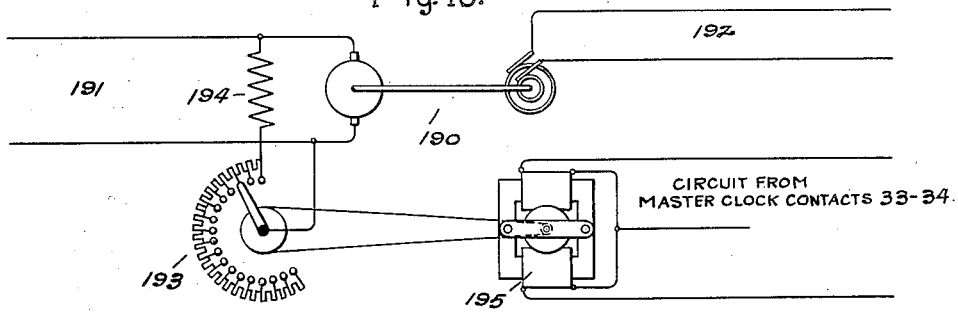
Figure 20:
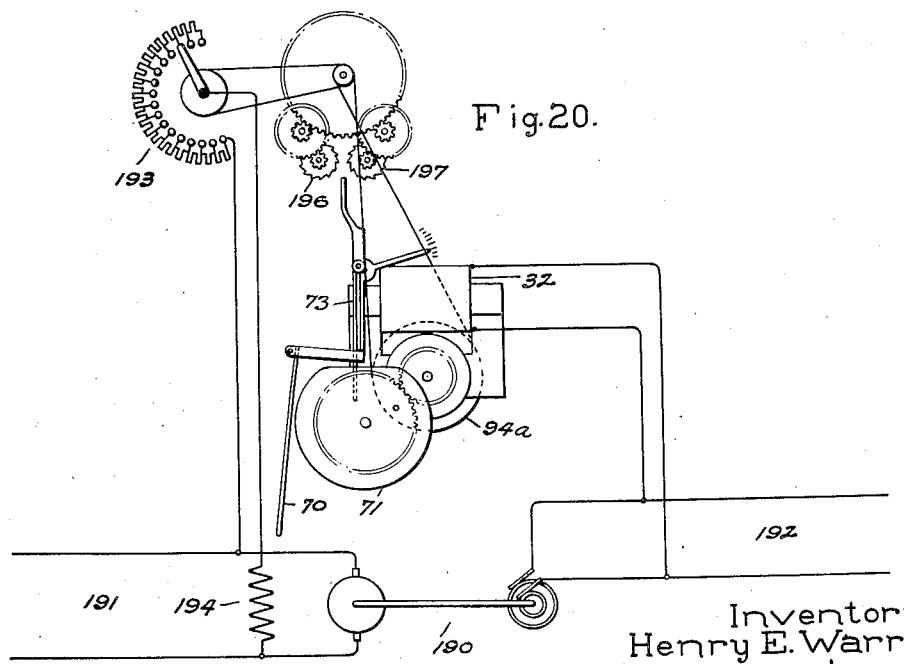

The features of my invention which are believed to be novel and patentable will be pointed out in the claims appended hereto. For a better understanding of the invention reference is made in the following description to the accompanying drawings which represent in Fig. 1 a general assembly drawing of the desirable parts of my improved regulating apparatus as applied to the regulation of a multiple unit water power generating station for large distribution systems; Fig. 2 is a front view of the frequency error measuring device which I have chosen to call an automatic master clock; Fig. 2a shows a portion of the master clock in a different operative position than that in Fig. 2; Fig. 3 is a side view of the master clock represented in Fig. 2; Figs. 4 and 5 are side and end views respectively of the master controller which is a device which receives corrective current impulses from the master clock, transforms them into proportional rotative motions in a commutator device and distributes these movements electrically to various controlling and indicating devices, certain features of which are claimed in my divisional application Serial No. 402,508, filed November 25, 1929; Fig. 6 is a sectional view of one of the several motion reproducing motors operated from the master controller; Figs. 7 to 12 are explanatory diagrams showing the various corresponding rotative positions of the master controller transmitting commutator and one of the motion reproducing motors, which will be referred to in explaining the operation of this type of motion transmitting systems; Figs. 13, 14 and 15 are different views of one of the unit controllers, Fig. 13 being a face view of the device with a portion of the front cover broken away; Fig. 14 a plan view with the top cover removed, and Fig. 15 a side view as seen from the right side of Fig. 13 with that side of the casing removed, together with a motion transmitting motor which is operated in accordance with the extent of gate opening of the water turbine or the load on the generator driven by such turbine or other source of power. Fig. 14a is a view of a contact device as removed from the case of the unit controller in order to more clearly illustrate its construction; Fig. 16 shows how the control may be made dependent on the power output of the power generating unit instead of dependent on the gate opening of the prime mover and also how the master clock pendulum may be biased in response to certain load conditions; Fig. 17 represents a switching arrangement for changing from automatic to manual control and vice versa; and Figs. 18, 19 and 20 represent simplified embodiments of my invention.

In Fig. 1 I have represented a hydroelectric power generating station containing water turbines 20 driving alternating current generators 21. The number of such generating units which may be controlled by a single master clock controller may vary. Also the capacity of the different units controlled may be different and the prime movers may be steam turbines or prime movers of other types. Each prime mover is equipped with the usual speed governing apparatus represented at 22 and the application of my improved regulating system thereto involves no special modification of such existing governing mechanism. The electric motor represented at 23 may be the usual motor employed to alter the governor adjustment so as to increase or decrease the speed of the unit from the station switchboard in the synchronizing operation. Many other devices for varying the speed of the source of power or for correcting the speed of the generator or other alternating current apparatus may be adapted to this method of automatic speed regulation; such for example as those described in my United States Patents 1,420,896, 1,505,925 and 1,522,216. 24 represents the supply pipes for the water turbines, 25 the levers operated from the governors which regulate the gate opening and 26 represent electric motion transmitters geared to the turbine gate operating mechanism whereby the extent of gate opening may be transmitted to the unit controllers. The generators 21 are connected to supply the outgoing feeder bus 27, and 28 is a transformer for supplying the low voltage circuits of my improved frequency regulating apparatus from bus 27.

The control apparatus of my invention is arranged to maintain the instantaneous frequency and the average frequency of the system supplied by the power station at a high degree of accuracy by regulating the gate openings of the water turbines and to maintain an equal or proportionate load distribution between the generating units. The control apparatus as here represented includes a master clock regulator represented generally by the reference character 30 having an extremely accurate one second pendulum 31 and a synchronous motor 32 energized from system 27 through transformer 28 and conductors 101 and 102. A comparison is made between the rate of the pendulum and the motor every two seconds. If the frequency is exactly correct, the relation of the synchronous motor to the pendulum will be constant, but if the frequency is high or low the synchronous motor will run slightly fast or slow during these two second intervals. The error, if any, which accumulates during this small time interval is measured even though the amount may be less than 1/400th of a second in time. As soon as an error is detected by the master clock it opens one or the other of the sets of contacts 33 or 34 depending on whether the error is positive or negative and the duration of opening is proportional to the error. These contacts actuate the master controller represented generally by the reference character 35. The master controller is operated by two motors 98 and 99 best shown in Fig. 4. One motor is controlled by contacts 33 and serves to drive the commutator device 38 in one direction and the other motor is controlled by contacts 34 and serves to drive the commutator device 38 in the opposite direction. The extent of travel of the commutator device 38 during a two second interval is dependent upon the duration of opening of the contact at 33 or 34. The master controller 35 is thus caused to send out electrical current impulses which are transmitted over the circuits 39 to a number of receiver motors 40, 41, 42 and 43, all of similar construction, which reproduce the motion of the commutating device 38. The motor 40 is arranged to correct the relation between the pendulum 31 and synchronous motor 32 at the end of each time interval by an amount corresponding to the error measured so as to place the master clock controller in a condition to accurately measure the error in the next succeeding time interval. The motor 41 operates a station indicator 44 which shows at all times the accumulated error, if any, in the frequency. The rotor of motor 41 is geared down to two hands 45 and 46 such for example that one hand makes a complete revolution for one second accumulated error in frequency and the other makes a complete revolution for twelve seconds accumulated error in frequency. When no error exists the two hands correspond to the position of 12 o'clock on a clock dial and move to the right or left to indicate positive or negative errors in integrated frequency.

It will be evident that owing to the small time interval employed and the magnified motion of the fast moving hand of the indicator this hand likewise serves to indicate very clearly the instantaneous errors in frequency because if this hand continues at rest the observer may be sure that the instantaneous frequency is correct even though there may be an accumulated integrated frequency error.

Motors 42 and 43 serve to reproduce the movement corresponding to the frequency error as integrated over the two second interval at the unit controllers indicated by reference characters 47 and 48. These unit controllers are similar and are employed to regulate the two prime movers to correct for the frequency errors and to maintain a desired load distribution between the power units.

In general these unit controllers compare the valve or gate opening or the degree of regulation of the controlled prime mover with the allowable integrated frequency error and maintain the gate opening proportional to this integrated frequency error. The integrated frequency error is transmitted to the unit controller through the motors 42 and 43 while the extent of gate opening as measured by the motion transmitting devices 26 is transmitted to the unit controllers through the motion reproducing motors 49 and 50. These two quantities are indicated on a dial by pointers 52 and 51. The two movements are compared by means of a differential and the speed adjusting motors 23 are controlled from the differential through contact special devices 53 to maintain the gate opening proportional to the allowable integrated frequency error and to keep the instantaneous frequency error approximately zero.

I prefer to combine with the master clock controller 30 signal devices which will call attention to abnormal frequency errors. Such signal devices may comprise lamps 55 and 60 and an alarm 61, which devices are controlled by adjustable back contacts 62 and 63. Ordinarily these contacts are not closed by the master clock regulator, but in case the frequency error as measured over a two second interval increases to an abnormal extent these contacts are intermittently closed, thereby informing the station attendant that abnormal load changes are taking place and the direction thereof, such for example as may necessitate the starting up of another power generating unit.

Having thus briefly outlined the general character and function of the combined apparatus I will now proceed to describe the details and operation of the several novel devices starting with the master clock, the details of which are best shown in Figs. 2 and 3.

The starting point of the control system is a high accuracy free pendulum 31. The pendulum should be mounted on a solid foundation free from vibration and should be compensated for changes in temperature. It is preferably provided with suitable means for adjusting its rate such as a small platform 64 upon which graduated weights 65 may be placed. For purposes of automatic rate adjustment of the pendulum, an example of which will hereinafter be explained, I may also provide it with a small permanent magnet 66 near its free end and place a stationary magnetizing coil 67 adjacent to the path of movement of the pendulum. Now, if the coil is energized with direct current so as to produce a repelling force on the permanent magnet it will have the same effect as a decrease of gravity causing the pendulum to decrease its rate. If the current in coil 67 is reversed its field will attract the magnet 66 and produce the opposite effect and an increase in the rate of the pendulum.

Pivoted at 68 near the point of suspension of the pendulum 31 is a small weight lever 69 having an extended flexible rod 70 for the purpose of periodically impressing the pressure of the lever against the pendulum rod 31. The weight lever 69 rests against the surface of a cam 71 which is so shaped that for a small portion of its revolution the flexible rod 70 will be free to press against the pendulum rod 31 but at all other positions in the revolution of the cam there will be no contact between the pendulum rod and the rod 70. The cam 71 is driven through suitable gearing from the synchronous motor 32 so arranged that one complete rotation of the cam normally corresponds to the double vibration of the pendulum and the relation of the parts is such that during the left hand swing of the pendulum the rod 70 will rest against the pendulum rod for a short distance both sides of the center of swing of the pendulum. This force keeps the pendulum 31 in oscillation.

It is a fact that impulses imparted to a swinging pendulum at the center of its stroke cause a minimum disturbance to its rate of oscillation. This condition of course requires approximately correct phase relation between the revolving cam 71 and the swinging pendulum and such phase relation must be established and can only be maintained by proper correspondence between the frequency of the system which supplies the synchronous motor and the rate of swing of the pendulum or by a frequent readjustment of the phase relation of the cam 71 with respect to the pendulum if the system frequency is not correct. Means for determining variation in the phase relation of the cam and the pendulum and for correcting errors in this phase relation are provided in the following manner:

Loosely pivoted at 72 is a short pendulum 73 having an upward flexible extension 74. The pivot bearing 72 preferably is mounted upon an adjustable eccentric 75 of which the angular position is shown by a pointer 76 and scale 77 to enable the position of pivot 72 to be adjusted with exactness. The slot 78 in the pendulum 73 is such that the pendulum may be freely lifted past the pivot 72; but if free to drop, the upper end of the slot will rest against the pivot 72. The lower end of the pendulum 73 at point 79 is interfered with by the lever 69, when the latter is in the position shown in the drawings. If, however, lever 69 were sufficiently depressed, pendulum 73 would swing to the left and the distance to which it would swing to the left would be determined by interference between the lower end of the pendulum at point 79 and the sloping upper surface of the lever 69.

When the phase relation of the cam 71 which revolves clockwise and the main swinging pendulum 31 is correct, the lever 69 which has been resting upon the cam will be released at the flat portion 80 of the cam and will be permitted to drop until the rod 70 rests against the moving pendulum rod 31 which is at that time swinging toward the left near the center of its oscillation. The phase relation is such that contact between 70 and 31 takes place shortly before 31 has reached its midposition and of course after this contact occurs the lever 69 drops downward at a rate corresponding to the velocity of the pendulum rod 31.

Soon after rod 70 has been permitted to rest against pendulum rod 31 and has thereby imparted pressure corresponding to the weight of the lever 69 in a direction tending to accelerate the pendulum 31, the auxiliary free pendulum 73 will be released at the point 79 and this pendulum will swing quite rapidly, on account of gravity, toward the left, keeping pace with the leftward swing of pendulum 31 and the correspondingly increasing angular depression of lever 69. Meanwhile, the cam 71 continuing in its revolution, will soon reach a position where it will again pick up the lever 69 together with the free pendulum 73 which is now resting upon the upper surface of this lever and will forcibly raise the two parts upward. Consequently the pressure of 70 against pendulum rod 31 will be released and pendulum 31 will continue its left hand swing until it reaches the end of its travel, when it will return toward the right without any contact whatever on its right hand swing with the rod 70, for the reason that the rod has been moved far enough to the right by the cam 71 to entirely clear pendulum rod 31 as it swings to the right.

The final position of the free pendulum 73 with respect to the lever 69 will depend entirely upon the angle to which the lever 69 has dropped at the instant when it is pushed up by the revolving cam 71. Consequently, this position will depend upon the phase relation between the cam 71 and the pendulum rod 31. Fig. 2a shows one relation of these parts just prior to the upward movement of lever 69 by cam 71.

Any gain in speed of the cam above normal would cause the lever 69 to be pushed upward with a smaller angle of slope and consequently a less displacement toward the left of the pendulum 73 while speed below normal of the cam 71 will tend to bring about the later lifting of the lever 69 with a consequently greater angle of slope and a greater displacement toward the left of the pendulum 73.

As a result of these activities the upper end at the point 81 will move upward when the lever 69 is lifted by the cam in different positions along a horizontal line, which positions will depend entirely upon the phase relation between the cam 71 and the pendulum 31. If the phase relation of these two members is correct the point 81 will enter the space at 82 between the two flexible contactors 83 and 84 so as not to affect either of these contactors when the pendulum 73 is pushed upward by the action of the cam 71. If, however, the cam 71 is fast with respect to the pendulum rod 31, point 81 will be at the left hand of the gap 82 and when the free pendulum 73 is pushed upward contact 83 will be lifted which will open circuit it at adjustable contact point 33. The cam 71 has a gradually reduced radius from the point 85 in a counter-clockwise direction to the point 86 and as a result the free pendulum 73 will be gradually lowered after it has reach its extreme height and as a result the duration of the circuit opening at point 33 or 34 as the case may be will be measured by the amount of the left hand or right hand deviation of the point 81 from its mid position 82 when the free pendulum is lifted. This is on account of the step formation at the ends of the contactors 83 and 84; consequently, if the error in the phase relation between the cam 71 and the pendulum 31 is very slight so that push rod 74 comes up only a little to the right or left of point 82 there will be a brief opening of circuit at points 33 or 34 but if the deviation is considerable there will be a correspondingly greater duration of opening at points 33 or 34.

As the cam 71 continues its revolution after having lifted lever 69 with free pendulum 73 on top and consequently displaced either one or the other of contactors 83 or 84 and has again been lowered there will come a time when a pin 87 projecting from the back face of the cam will engage a slender downward extension 88 of the pendulum 73 so as to force this free pendulum to the right along the upper surface of the lever 69 and beyond the right hand end of this lever into the position shown in Fig. 2 where the pendulum 73 rests lightly against the outer end of the lever 69. The mechanism is then ready for the next cycle of operations.

Of the several position indicating motors in the circuits 39 controlled by the master controller 35 the one 40 mounted on the master clock is for the purpose of correcting the phase relation between the cam 71 and the moving pendulum 31. This motor, through reduction gears 89, 90, 91 and 92 is attached by means of ratio gears 93 and 94 directly to the casing 95 of the synchronous motor 32 which drives the cam 71. The arrangement is such that this entire motor casing with the reduction gearing which it contains, as in my Patent 1,495,936, can be rotated freely within the poles of the field 32. The circuit connections are such that the rotation of the position indicating motor 40, as a result of the phase error between the revolving cam 71 and the pendulum 31 with the resultant opening of one of the contacts 33 or 34, will immediately shift the cam 71 which is directly driven by the motor 32 through the gears 96 and 97, either forward or backward by an angle corresponding approximately with the amount of the error in phase, so that if no further phase shifting should occur, the upper end of the free pendulum 73 on its next upward movement passes through the space 82 between the contactors 83 and 84. If any residual error remains there will be a further similar correction at the next upward stroke of the pendulum 73. If the error in the frequency of the system continues the synchronous motor 32 will again shift cam 71 out of its correct phase relation with the pendulum 31 and then the correction action will be repeated at every complete oscillation of the pendulum so long as the frequency is in error. This means that the cam 71 will be maintained very close to its correct phase relation to the pendulum 31 by periodic corrections substantially equal to the amount of the error accumulated during each oscillation of the pendulum and the corrections will of course be greater or less according as the error in frequency is greater or less.

The gear reduction ratio of the motor 32 is designed for the standard frequency to be regulated so that when the frequency is normal the cam 71 will make one revolution in two seconds, or the time required for a double vibration of the pendulum 31. The pendulum 31 having been accurately adjusted to a rate of one complete oscillation in two seconds will be kept in operation through member 70 by energy impulses originating from the synchronous motor 32. The apparatus will then measure small errors in the frequency which accumulate in each two second interval and actuate the contact devices 33 or 34 in accordance with the direction and extent of such errors. The apparatus is sufficiently sensitive to detect and correct for an error of 1/500th of a second in a two-second interval. Any error sufficiently great to actuate the corrective control contacts will also set into operation the motor 40 to substantially correct the phase relation between the cam 71 and pendulum 31 at the end of the interval. As a result of this correction of the phase relation after each operation of the contact there is no tendency for the apparatus to overshoot and hunt in the control of the prime movers as would otherwise be the case.

The next piece of apparatus to be described is the master controller 35 shown in detail in Figs. 4 and 5 and which is controlled by the master clock through normally closed contacts 33 and 34. The master controller is driven by a reversible electric motor device comprising two motors 98 and 99. Each of these motors may be self-starting synchronous motors, like the motor 32. The rotors of these motors are mounted on the same shaft contained within the upper extension of the gear casing 100 (see Fig. 4). The motors are arranged to drive the shaft in opposite directions. As shown in Fig. 1, both motors are normally energized, motor 98 being connected from supply line 101 through normally closed contact 33 through the motor field to the other supply line 102. Motor 99 is connected from supply line 101 through normally closed contact 34, the motor field coil, back to line 102. In this constantly energized condition of the two field coils the shaft on which the rotors are mounted remains stationary but the instant contact 33 is opened by the master clock motor 99 drives the shaft in one direction. Likewise, the opening of contact 34 permits motor 98 to drive the shaft in the opposite direction. In this manner I am able to minimize coasting of the motor device when it is desired to stop it and at the same time to retain the benefit of the extremely rapid acceleration which is characteristic of this type of self-starting synchronous motor. The action in response to certain changes produced by the master clock at points 33 and 34 is exceedingly prompt and dead beat and the extent of movement produced is proportional to the duration of the opening of the contact at 33 or 34 as the case may be.

This motor device drives, through suitable reduction gearing, a portion of which is indicated at 103, a pair of commutator brushes 104 and 105 preferably of the roller type which make contact with a stationary commutator having 12 equally spaced segments 106. The roller contacts 104 and 105 are carried by arms extending from a shaft 103A indicated in dotted lines in Fig. 4. Gear 103 is mounted on this shaft and the shaft is supported in a framework having end pieces 107 and 108 mounted between bolts 109 extending through an insulating base support 110. This base supports the commutator segments and the driving motors and is provided with suitable electric terminals for making the necessary connections. A carbon brush 111 is pressed against the end of shaft 103A and serves to convey current to the metallic rollers 104 and 105.

The circuit connections for the commutator distributor are shown in Fig. 1. It will be noted that the 12 stationary contacts are arranged in a three-phase four-wire arrangement with Y connections. Every third segment is connected together corresponding to a three-phase circuit repeated four times. The three parallel connected sets of contacts are connected to the three distribution lines 39 which extend to the various position reproducing motors 40, 41, 42 and 43. The movable brushes 104 and 105 are connected to one side of the source of supply by line 101. The three field coils of the position reproducing motors are connected on one side to the lines 39 and on the other side to a Y point connected to the other side of the source of supply through line 102. This type of motion transmitting system may be energized by either direct or alternating current.

The preferred construction of the motion reproducing motors and the operation of this motion reproducing system will now be described in connection with Figs. 6 to 12 inclusive. A very desirable construction for the motion reproducing motors such as are represented at 40, 41, 42 and 43 is shown in Fig. 6 and consists of three separate fields 115, 116 and 117 the exciting coils of which are connected as shown in Fig. 1, as previously explained. Each field is provided with twobar rotors all mounted on the same shaft. If the line of magnetization produced by the three field coils lies in the same plane the sixbar rotors will be dispersed equally over 360 degrees, as represented in Figs. 6 and 7, where the rotors are lettered $a$, $b$, $c$, $d$, $e$ and $f$ respectively, $a$ and $b$ being the rotors in field 115, $c$ and $d$ the rotors in field 116, and $e$ and $f$ the rotors in field 117.

In Fig. 7 the position of the commutator brushes 104 and 105, which are displaced from each other by a suitable angle for the purpose of properly spacing the impulses in the three phases of circuit 39, are such as to energize field 115 only. Consequently, its two rotors $a$ and $b$ will be equally influenced and take the position represented in this figure.

In Fig. 8 the brushes have been rotated counter-clockwise $\frac{1}{24}$th of a revolution and into a position where coils 115 and 116 are energized. The four rotors $a$, $b$, $c$ and $d$ will therefore tend to take a resultant position of least reluctance as shown which advances the motor shaft $\frac{1}{12}$th of a revolution.

In Fig. 9 the brushes are advanced another $\frac{1}{24}$th of a revolution and coil 116 is energized alone. Rotors $c$ and $d$ are equally influenced and advance the shaft another $\frac{1}{12}$th of a revolution.

Figs. 10, 11 and 12 represent further similar corresponding advances of the transmitter and receiver with the coils and rotors which are active indicated in each case.

Thus it will be seen that with this arrangement there are six different angular positions of the rotor of the motion receiving motor for each complete cyclic change of the current which causes a half revolution of the motor. Two revolutions of the motor, or 24 different positions, correspond to one revolution of the transmitting commutator. The apparatus operates in the same manner in either direction. All of the position indicating motors 40, 41, 42 and 43 being connected to the same circuit 39 and the source of supply in multiple will of course move simultaneously and to the same extent. I consider that this motion transmitting system has certain novel features and to be particularly advantageous in the control system disclosed, but I of course do not limit my invention to any particular motion transmitting system.

Attention is next directed to the unit controllers shown at 47 and 48 in Fig. 1. One of these unit controllers is shown in detail in Figs. 13, 14 and 15 and since they are similar the detail description of one will suffice.

Before proceeding with the detail description it seems desirable to state that the main purpose of this unit controller is to compare the integrated frequency error, as summed up by the motion reproducing motor 42, with the gate opening of the prime mover 20 as transmitted to the unit controller by the motion reproducing system comprising transmitter 26, transmitting lines 120 and receiver 49 and to automatically control the speed adjusting motor 23 of the prime mover governing mechanism so as to maintain a gate opening which is proportional to the integrated frequency error. By means of the device 26 we obtain an approximate measurement of the relative power output of the power unit as compared to its maximum power output capacity. This measurement is compared to the total integrated frequency measurement of the system by the differential mechanism of the unit controller and the unit controller automatically controls the power output of the generating unit through its speed adjusting means so as to maintain a power output approximately proportional to the total integrated frequency error of the system. Let us assume for example that, with the automatically controlled prime movers 20 adjusted so as to deliver no power but with other power generating apparatus, not shown, delivering the minimum power requirements of the system and maintaining the frequency such that the integrated frequency error of the system is zero, additional load is taken from the system such as to produce a slight lowering of the system frequency. Immediately the master clock regulator detects this lowering of the frequency and transmits the integrated errors as measured over two-second intervals to the unit controllers. These unit controllers open the gates of the controlled prime movers by an amount proportional to such error. The additional load supplied by the automatically controlled units does not wipe out the accumulated integrated frequency error but merely brings the instantaneous frequency back to normal so that no further error accumulates unless the load changes. Additional load may result in a further accumulated frequency error causing a further opening of the turbine gates of the automatically controlled units. Likewise, a decrease in load may produce a slight increase in frequency and a lowering in the accumulated frequency error. This causes the unit controllers to close the turbine gates by a proportional amount so as to immediately bring the instantaneous frequency back to normal. The total allowable integrated frequency error corresponding to full gate opening may be, and preferably is, made very small; for example, one-third of a second. A sufficient number of automatically controlled generating units are of course provided to control the frequency of the entire system in this way such that the integrated frequency error never exceeds one-third of a second. Thus the automatic control maintains the instantaneous frequency error at approximately zero and maintains the integrated frequency error at such a low value that it has no significance upon the use of the system for the correct distribution of time by secondary clocks. An exceptionally uniform load control of the entire system is obtained without hunting, such that extensive distribution systems may be controlled without disturbing influences tending to shift load from one power plant to another and the principal reason for this is that the automatic controller of my invention is far more sensitive and precise than the usual speed governor. The unit controller represented in Figs. 13, 14 and 15 is an important element in the control scheme just outlined and will now be explained.

The motion reproducing motor 42 which is responsive to the integrated frequency error changes drives a shaft 121. This shaft is geared to a shaft 122 carrying a long pinion 123. The two sets of gears represented between shafts 121 and 122 are for the purpose of changing the gear ratio if that becomes desirable to make the device responsive to a total allowable integrated frequency error of one second, for example, and to correspondingly decrease the rate of regulation. A gear 124 integral with a nut 125 and a sleeve 126 is driven from the pinion 123. Sleeve 126 drives a pointer 51 through a sliding connection comprising collar 128 and pins 129. This pointer 51 indicates the integrated frequency error on a dial 130.

The motor 49, connected to the gate opening transmitter 26 through lines 120, drives a worm shaft 133 through gears 131 and 132. The shaft 133 extends forward and carries a pointer 52 in front of the dial 130. This pointer thus indicates the gate opening on the dial 130. As a result the relation between the integrated frequency error and the gate opening may be visually compared on the dial. Zero integrated frequency error and zero gate opening preferably correspond to approximately a twelve o'clock position of the pointers on the dial. Pointer 52 makes substantially a complete revolution in a clockwise direction for a complete opening of the turbine gate and pointer 51 makes substantially a complete revolution in a clockwise direction for the total permitted integrated frequency error caused by a lowering of the frequency below normal. Adjustable stop pins 124a are preferably provided on the periphery of wheel 124 to limit the rotation of this wheel as desired so as to limit the automatic control to any desired range of gate opening. A complete revolution of pointer 51 may correspond to one-third of a second integrated frequency error. The two hands are differently shaped or colored so as to distinguish them.

The relation between the gate opening and integrated frequency error is also compared mechanically by this device through a differential mechanism which so controls the circuit of speed control of motor 23 as to maintain the two hands 51 and 52 in the same or approximately the same position on the dial, or so as to maintain the gate opening proportional to the allowable integrated frequency error. Shaft 133 carries a worm thread 134 with which the internally threaded nut 125 meshes. Thus, a turning of shaft 133 corresponding to a gate opening movement moves nut 125 towards the dial or downward, as viewed in Fig. 14. A turning of nut 125 corresponding to an increase in the integrated frequency error moves nut 125 away from the dial. Simultaneous turning of both shaft 133 and nut 125 in the same direction and at the same rate produces no longitudinal movement of the nut at all. Longitudinal movement of nut 125 is employed to move the flexible contact arm 135 up and down as viewed in Fig. 14. This contact arm is carried on an insulating collar 136 mounted on a shaft 137. The preferred manner of mounting this contact drive is represented in Fig. 14a which shows the arm, together with its mounting, removed from the case in a position corresponding to that in Fig. 13. The shaft 137 supports an arm 138 which carries at its free end a roller 139. Roller 139 is held against the rear end of nut 125, see Figs. 14 and 15, by a spring 140. Consequently this roller, together with arm 138, will follow the movement of nut 125. This movement is transfererd to contact arm 135 through an upward extending pin 141 on arm 138, a downward extending pin 142 on the insulating block 136 and a spring 143 exerting pressure tending to keep the two stop pins in contact. Normally, are arm 138, contact arm 135 and nut 125, move back and forth together. Springs 140 and 143, however, permit an abnormal movement of contact arm 135 in either direction without bringing undue pressure on roller 139 such as might cause breakage or displacement of the parts in case automatic operation of any portion of the apparatus should be suspended as hereinafter explained.

The free end of contact arm 135 is forked and cooperates with a pair of contacts 144 and 145. This contact device is designated generally by the reference character 53 in Fig. 1. Contacts 144 and 145 are insulated from each other and mounted on a shaft 146 which is driven by a motor 147 at one revolution in a few seconds. The two contacts 144 and 145 are helical in shape and so driven that the portions of the contacts opposite to the contact arm 135 approach the latter. This not only provides a wiping contact and a rapid break, but what is more important, it provides a duration of closure which is proportional to the displacement of contact arm 135 from its central position. The internal threaded insulating sleeves upon which the two helical contacts are mounted may be turned on the threaded shaft 146 for the purpose of adjusting the spacing between them. A hub of conductgin material is provided with each helical contact against which brushes 148 rub to provide the necessary circuit connections. The circuit connection to contact arm 135 is represented at 149.

The arrangement and adjustment and adjustment of the parts are such that when the hands 51 and 52 are together at any position on the dial 130 corresponding to a gate opening which is proportional to the selected allowable integrated frequency error, contact arm 135 is equi-distant from contacts 144 and 145 and no contact with either is made for any rotative position of shaft 146 and consequently no current impulses are sent to the speed control motor 23 (Fig. 1). If now motor 42 is actuated in response to an error in frequency as detected by the master clock, for example by an error which increases the total integrated frequency error, nut 125 will be turned, moving pointer 51 in a clockwise direction and roller 139 and contact arm 135 up as viewed in Fig. 14, thereby bringing the forked end of contact arm 135 in position to be wiped by contact 144. Owing to the helical shape of contact 144 the duration of such contact will depend upon the amount of displacement of arm 135 which is of course dependent on the magnitude of the error integrated by the master clock in the two second interval. Speed control motor 23 is thus energized for a corresponding interval causing a proportionate opening of the turbine gate. The change in gate opening is immediately transferred to motor 49 which turns shaft 133 and pointer 52 in a clockwise direction by an amount which again approximately alines the two hands and moves nut 125, roller 139 and contact lever 135 back to a central position. This action is repeated every time the master clock detects a frequency error and the magnitude and direction of regulation is such as to correct the instantaneous frequency permitting the total integrated frequency error to vary with the gate opening within the limits determined by the adjustment and calibration of the apparatus.

The action of the master controller is preferably modified by a stabilizing mechanism which permits a limited amount of resilient endwise movement of the shaft 133 during the operation of the appartus. It will be noted that the endwise position of the shaft 133 is normally biased to its proper position by the collar 150, Fig. 14. This collar is held between two arms 151 and 152 which are pivoted on the framework at 153 and 154 respectively. A spring 155, the central portion of which is broken away in Fig. 14, normally holds arms 151 and 152 against adjustable stops 156 and 157 to correctly locate the endwise position of shaft 133. This arrangement thus permits a resilient endwise movement of shaft 133 in either direction if sufficient force is exerted but returns the shaft to its correct position as the force is removed. This resilient device for determining the endwise position of shaft 133 acts against a dash pot 158 (see Fig. 15). The dash pot 158 is connected to shaft 133 through a coarse pitch worm 159 on the shaft, an internally threaded nut 160 and a lever 161. The lever is pivoted at 162. One end is forked and embraces pins on nut 160 which prevents the nut from turning and the other end is pivoted to the plunger of the dash pot. With this arrangement, whenever shaft 133 is turned, nut 160 tends to be displaced endwise. Rapid displacement of nut 160 in an endwise direction is resisted by the dash pot and as a result whenever shaft 133 is turned, a considerable amount in the operation of the device in response to a movement of the turbine gate there may ccour both an endwise displacement of the nut 160 in one direction and a displacement of shaft 133 in the opposite direction. The action of the dash pot and consequently the amount of endwise displacement of shaft 133 under such conditions may be adjusted by a valve in the dash pot piston as indicated at 162A, Fig. 15.

The pitch of worm 159 is opposite to that of worm 134 embraced by nut 125 so that the action of the dash pot is to momentarily check the full controlling action of the master controller on the speed control motor 23. This steadying action may be explained as follows: So long as the two hands 51 and 52 are together, the position of the nut 125 and the shaft 133 will be such that no contact is made at 144 or 145, and therefore no current impulses are sent to the speed control motor 23. When an error in the integrated frequency occurs so as to rotate nut 125 an axial motion of nut 125 will occur and contact will be made between contact arm 135 and one of the helical contacts 144 or 145, thus sending corrective impulses to the speed control motor 23. As soon as the turbine gate moves, the shaft 133 will begin to revolve and this will tend to restore the correct relationship between the two hands 51 and 52. This will also tend to bring the contact arm 135 back to its neutral position through the action of worm 134 on nut 125. This action will be assisted by motion of the screw thread 159 on nut 160 which will move the shaft endwise in opposition to one of the spring pressed levers 151 or 152 because during this action the resistance of the dash pot 158 will prevent material axial motion of the nut 160. Consequently the correcting action upon the speed control motor will be checked before the two hands 51 and 52 are together, but after checking of the corrective action occurs, the dash pot piston will very slowly yield to the pressure placed upon it by the spring 155 acting through the screw thread 159 and nut 160 so that a further very gradual additional correction of the speed controller will be permitted by a further contact of very short duration at 144 or 145 as the case may be. Consequently, the hands 51 and 52 will slowly continue to approach their alined relationship and the device will not be in final equilibrium until these two hands are together. It will be observed that after a correction in one diracing of the controlling function while a very prompt correction in the opposite direction so that if over-correction should occur on the first impulse, the slow motion of the dash pot under the influence of the spring 155 will actually be added to the effect due to divergence of the hands. The effect of the dash pot and its associated parts is thus to prevent over-correction and reacting of the controlling function while permitting exceedingly correct regulation of the frequency with a minimum amount of turbine gate adjustment in a minimum interval of time.

The anti-racing effect of the dash pot is not always needed, and this feature may then be omitted.

The motion transmitting system between the turbine gate and master controller through the devices designated by reference characters 26, 120 and 49 in Fig. 1 is connected to represent the well known selsyn system. To avoid confusing the drawing with additional circuit connections the complete circuit connections between devices 26 and 50 and the source of supply have not been shown. Any reliable motion transmitting system may be used here in place of the one represented.

In some cases it may be desirable to make the gate opening proportional to the integrated frequency error as compared with the measured power output of the alternating current generators 21 and in Fig. 16 I have represented the motion transmitting system, corresponding to that designated by reference characters 26, 120 and 49 in Fig. 1, as being connected between a wattmeter 163 measuring the output of the generator 21 and the unit controller. In this case the hand 51 will represent integrated frequency error as before and hand 52' will represent power output and the apparatus will be adjusted to maintain a gate opening such that the two hands will keep together. This arrangement is beneficial where the pressure of the fluid supplied to the prime mover varies materially.

In Fig. 16 I have also represented how the rate of the master clock may be biased to further regulate the load distribution. Let us assume for example that the lines 27 represent a tie line between two large distribution systems 164 and 165 and that the controlled station is feeding power to system 165. Consider first that the double-pole, double-throw switch 167 is thrown to the right and that switch 168 is closed. This will connect the pendulum biasing coil 67 through a rectifier 169 to a current transformer 170 responsive to the current in the tie line 27. The polarity of coil 67 is such as to produce a south pole field at its upper end opposite to the south pole of the small permanent magnet contained in the pendulum. Then, as the pendulum sweeps past the coil, there will be an upward force on it due to the repulsion between the coil and magnet. This slows down the rate of the pendulum in proportion to the current in the tie line 27. Resistance 171 is provided for adjusting purposes. The current strength of coil 67 and the pendulum will be so adjusted that when the desired amount of current is flowing in tie line 27 the rate of the pendulum will be exactly correct to keep the frequency of the system at its normal value. Now, when a heavier current flows in the tie line, the pendulum will be slowed down very slightly and the controlled station will of course respond to this slower rate tending to hold the slightly lower frequency corresponding to the rate set by the pendulum until the current in the tie line is reduced to normal. On the other hand, if the current in the tie line falls below normal, the pendulum will not be biased so much and as a result it will oscillate slightly faster than normal until the current in the tie line has been brought up to normal. Such changes in the rate of the pendulum are very slight of course; for example, not more than a few seconds per day, but they are very effective in controlling the load.

A somewhat similar result is obtained if the switch 167 is thrown to the left as shown and the switch represented at 168 is opened. Now the coil 67 is energized from a constant voltage direct current source 172, having the correct polarity to produce a north pole at the upper end of coil 67, through a variable resistance 173 and the manually adjustable resistance 171. Resistance 173 is automatically controlled by rotation of the motion receiving motor 49 which is responsive to the gate opening or the power output measurement of generator 21 as desired. The pendulum rate is adjusted to be exactly correct with the desired load on the controlled unit. Now, if load on the controlled unit increases the resistance 173 is increased, thereby decreasing the current in coil 67. The rate of the pendulum is lowered and the apparatus which is responsive to the pendulum tends to gradually reduce the load on the controlled unit or units as the case may be. This arrangement would tend to maintain a fairly constant load on the controlled units. Obviously, the manually adjustable resistance 171 may also be used to bias the pendulum for load control either with or without the automatic load control feature just described. These resistance devices 171 and 173 may be built as a small adjustable rheostat mounted on the unit controller.

I prefer also to make provision for quickly shifting one or more of the power generating units from complete automatic to complete manual control and vice versa. One scheme for doing this is represented in Fig. 17 where 135 represents the contact arm and 144 and 145 represent the helical contacts of one of the unit controllers. 23 represents the speed control motor which is controlled by the contacts 135, 144 and 145 during automatic operation. Contact arm 135 is represented as energized from line 102 through a relay operated switch 175. When the manually operable switch 176 is closed, coil 177 of the relay is energized closing switch 175 for automatic operation. When the switch is closed a back contact 178 establishes a holding circuit for the coil 177. Switch 179 is provided for manual control. As shown, it is in a neutral position, but when turned in either direction contact arm 180 short-circuits coil 177, permitting switches 178 and 175 to open. The other contact arm 181 energizes one or the other of a pair of contacts which are connected in parallel with contacts 144 and 145. Consequently, by this switch the control of motor 23 is shifted from automatic to manual control. As soon as the switch is brought back to the neutral position shown, switches 175 and 178 close again, bringing the control of motor 23 back to the automatic device. If permanent manual control is desired, switch 176 is opened. This arrangement does not otherwise interfere with the operation of the unit controller, and, as pointed out previously, the unit controller is so built as not to become damaged by an abnormal displacement of the two hands 51 and 52 such as might occur during manual control. The station indicator 44, Fig. 1, is useful in the initial adjustment of the unit controllers and facilitates manual control operations by its indications.

The apparatus previously described is more or less complicated and I have found that these complications are justified where a large amount of power feeding an extensive distribution system is involved. When the invention is to be used on small isolated generating plants the equipment may be simplified considerably, and in Figs. 18, 19 and 20 I have represented such simplified embodiments of the invention.

In Fig. 18, 190 represents an inverted rotary supplied from a direct current source 191 and supplying an alternating current system 192. At 42A I have represented a motion reproducing motor similar to motor 42 in Fig. 1 controlled by the automatic master clock regulator, not shown, as previously explained. The unit controller 47 of Fig. 1 is replaced by a rheostat 193 operated by motor 42A. This rheostat controls a direct current shunt field winding 194 of the inverted rotary converter and this controls its speed and the frequency of the A. C. output.

In Fig. 19 the master controller and commutator distributor 35 of Fig. 1 have been eliminated and the reversible motor 195 is controlled directly from the automatic master clock contact, not shown. In this case I contemplate that the phase relation of he master clock cam 71, Fig. 1, shall be corrected by a very rapid correction of the frequency, rather than by the means previously described.

In Fig. 20 I have represented a direct mechanical connection between the master clock and the rheostat 193. In this case the upper end of the auxiliary pendulum 73 serves as a driving pawl for ratchet wheels 196 and 197, suitably geared or otherwise mechanically connected to the rheostat 193 for regulating the frequency and to the wheel 94A for correcting the position of cam 71 which is driven by the synchronous motor 32 in accordance with the frequency of system 192. It will be understood that the accumulated error in frequency as measured by the master clock over a two-second interval will determine the position of the auxiliary pendulum 73 when it is moved upward, such that the direction and extent of adjustment of rheostat 193 and wheel 94A will depend upon the direction and magnitude of the frequency error. These simplified systems, while having limitations, from the standpoint of smooth and accurate regulation, are nevertheless intended to be included within the scope of my invention.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In a regulating system for alternating current distribution systems, means for measuring the frequency error of the system over successive small time intervals comprising a timing device, means having a rate of movement dependent upon the frequency of the system such that when the frequency is correct, said means has a cycle of movement which is synchronous with that of the timing device, mechanism for comparing the rate of the timing device with the rate of the frequency responsive means, and means responsive to the frequency error measured over a time interval for establishing approximately a definite phase relation between the timing device and frequency responsive means.

2. In a regulating system for alternating current distribution systems, means for measuring the frequency error of the system over successive small time intervals comprising a timing device, means having a rate of movement dependent upon the frequency of the system such that when the frequency is correct, said means has a cycle of movement which is synchronous with that of the timing device, mechanism for measuring the departure from synchronism between said timing device and frequency responsive means during a time interval, and means for establishing approximately a definite phase relation between said timing device and frequency responsive means at the beginning of each time interval.

3. In a regulating system for alternating current distribution systems, means for measuring the frequency error of the system over successive small time intervals comprising a timing device which establishes the time intervals, means responsive to the frequency of the system having a rate of movement which is synchronous with that of the timing device when the frequency of the system is correct, mechanism for measuring the departure from synchronism between said timing device and frequency responsive means during each time interval, and means for approximately correcting the phase relation between said timing device and frequency responsive means caused by such departure at the end of each time interval.

4. In a regulating system for alternating current distribution systems, a timing device, means operated in response to the frequency of the system, said timing device and frequency responsive means having cycles of movements of the same duration and operating synchronously when the frequency of the system is correct, mechanism for measuring any departure from such synchronous relation during each cycle of movement, and means for advancing or retarding the frequency responsive means to correct any error in the phase relation between it and the timing device caused by such departure from synchronous relation at the end of each such cycle of operation.

5. In a regulating system for alternating current systems, apparatus for measuring errors in the frequency of the system over equal time intervals comprising a pendulum for establishing such time intervals, a rotative device driven at a rate dependent upon the frequency of the system such that it makes one revolution during a complete oscillation of the pendulum when the system frequency is correct, mechanism for measuring the extent which said rotative device is slow or fast with respect to the pendulum rate during each rotation, and means for approximately correcting the phase relation of said rotative device with respect to that of the pendulum after each such measurement.

6. In a regulating system for alternating current systems, means for measuring frequency errors over consecutive time intervals comprising a pendulum for establishing the time intervals by its rate of oscillation, a cam driven by a synchronous motor connected to the system such that the cam normally makes one revolution for each complete cycle of oscillation of the pendulum when the frequency is correct, mechanism for comparing the oscillating position of said pendulum with the rotative position of said cam during each cycle of operation to obtain a measurement of any error in the phase relation of the cam with respect to the pendulum, and means for approximately correcting said error by an additional movement of said cam at the end of each operating cycle.

7. In a regulating system for alternating current systems, means for measuring frequency errors over successive equal time intervals comprising a pendulum for establishing said intervals by a complete cycle of oscillation thereof, a cam driven by a synchronous motor connected to the system for normally rotating said cam one revolution during each of such time intervals when the system frequency is correct, a lever having a portion adapted to contact with said cam and another portion adapted to contact with said pendulum such that the movement of the lever and its position at the end of an operating cycle is determined by the phase relation between the pendulum and cam, and means dependent upon the position of said lever at the end of a time interval for correcting the phase relation of said cam with respect to the pendulum.

8. In a regulating system for alternating current systems, means for measuring the frequency error over successive equal time intervals comprising a pendulum for establishing such time intervals by a complete cycle of oscillation, a cam driven by a syn- chronous motor connected to the systems such that the cam normally makes a complete revolution during a time interval as established by the pendulum when the system frequency is correct, a pivoted lever member having an arm cooperating with the surface of the cam and another arm extending into the path of oscillation of said pendulum, such that the movement of said lever and its position at the end of a time interval is determined by the phase relation between the cam and pendulum, said lever member serving to keep the pendulum in oscillation and to measure any error in the phase relation of the cam, and means dependent upon such phase angle error measurement for substantially correcting the phase relation of the cam with respect to the pendulum at the end of a time interval.

9. In a regulating system for alternating current systems, means for measuring frequency errors therein over successive equal time intervals comprising a main pendulum for establishing such time intervals by a complete oscillation thereof, a cam driven by a synchronous motor from the system such that the cam normally makes a complete revolution during a time interval when the system frequency is correct, a pivoted lever member having a horizontally disposed arm adapted to rest by gravity upon the periphery of said cam and a vertically disposed arm extending into the path of oscillation of said pendulum, said cam having a depression in its surface which permits the lever member to rotate by gravity and give the pendulum a driving impulse, the slope of the horizontally disposed arm serving to measure the phase relation between the pendulum and cam when the latter subsequently lifts said arm, an auxiliary pendulum pivoted above said cam adapted to be oscillated in one direction by the cam member and to swing by gravity in the opposite direction by an amount determined by the slope of said horizontally disposed arm, said auxiliary pendulum being movable endwise whereby it is moved upward with the horizontally disposed arm by said cam, and means controlled by such endwise movement for correcting the phase relation of said cam at the end of each time interval.

10. In a regulating system for alternating current systems, means for measuring the frequency error thereof over successive equal time intervals comprising a main pendulum for establishing the time intervals by a complete oscillation of the pendulum, a cam member driven at a rate determined by the frequency of the system such that it makes a complete rotation during a time interval when the frequency is correct, an auxiliary pendulum pivoted above said cam, means for measuring the phase relation between the cam and main pendulum at the end of each time interval and positioning the oscillating position of the auxiliary pendulum accordingly, said auxiliary pendulum being mounted for endwise movement whereby it is moved upward by said cam member while in the oscillating position determined by the phase relation between the main pendulum and cam at the end of each time interval, electric contacts controlled by the endwise movement of said auxiliary pendulum, and electrical means controlled by said contacts for substantially correcting any error in the phase relation of said cam with respect to the main pendulum at the end of each time interval.

11. In a regulating system for alternating current systems, means for measuring the frequency error of the system over consecutive equal time intervals comprising a main pendulum which establishes the time intervals by its oscillations, a cam member driven at a rate responsive to the frequency of the system such that when the frequency is correct the cam member makes one revolution during such interval, means associated with said pendulum and cam for measuring the departure of said cam from a complete revolution during each time interval, two sets of electrical contacts, means responsive to said departure measuring means for actuating one set of contacts if the cam is fast and the other set of contacts if the cam is slow, and electrical means controlled by said contacts for substantially correcting the rotative position of said cam member at the end of each time interval.

12. The method of measuring frequency which consists in integrating the alternations with respect to time over such short time intervals that the value thus determined corresponds substantially with the instantaneous value of the frequency during the same time intervals.

In witness whereof, I have hereunto set my hand this 5th day of January 1929.

HENRY E. WARREN.

CERTIFICATE OF CORRECTION.

Patent No. 1,906,439. May 2, 1933.

HENRY E. WARREN.

It is hereby certified that error appears in the printed specification of the above numbered patent requiring correction as follows: Page 8, line 76, strike out the word "are"; and lines 112 and 113, after "adjustment" strike out the words "and adjustment"; page 9, line 119, strike out the words "racing of the controlling function while" and insert instead the syllable and words "rection the device is ready at all times for"; page 11, line 58, for "he" read "the"; and that the said Letters Patent should be read with these corrections therein that the same may conform to the record of the case in the Patent Office.

Signed and sealed this 11th day of July, A. D. 1933.

M. J. Moore.

(Seal) Acting Commissioner of Patents.